US009335788B2

(12) United States Patent
Choi et al.

(10) Patent No.: US 9,335,788 B2
(45) Date of Patent: May 10, 2016

(54) SLIM-TYPE DISPLAY MODULE FIXING APPARATUS FOR PORTABLE TERMINAL

(71) Applicant: Samsung Electronics Co. Ltd., Suwon-si, Gyeonggi-do (KR)

(72) Inventors: Jong Chul Choi, Suwon-si (KR); Hee Cheul Moon, Seongnam-si (KR); Kwang Jin Bae, Suwon-si (KR); Bong Suk Choi, Seoul (KR); Hyo Sung Kang, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 13/622,703

(22) Filed: Sep. 19, 2012

(65) Prior Publication Data

US 2013/0069497 A1    Mar. 21, 2013

(30) Foreign Application Priority Data

Sep. 19, 2011 (KR) .................. 10-2011-0094074
Aug. 29, 2012 (KR) .................. 10-2012-0094997

(51) Int. Cl.
*G06F 1/16* (2006.01)
*H04M 1/02* (2006.01)

(52) U.S. Cl.
CPC ........... *G06F 1/1626* (2013.01); *H04M 1/0266* (2013.01)

(58) Field of Classification Search
CPC ............ H04M 1/0266; H04M 1/0249; H04M 1/0252; H04M 1/0262; G02F 2001/133314
USPC .......... 455/575.1; 361/679.3, 679.21, 679.55, 361/679.56; 349/58
See application file for complete search history.

(56) References Cited

U.S. PATENT DOCUMENTS

| | | | | |
|---|---|---|---|---|
| 6,801,268 B2 * | 10/2004 | Huang et al. | .................... | 349/58 |
| 7,209,195 B2 * | 4/2007 | Lin | .................... | 349/58 |
| 7,295,258 B2 * | 11/2007 | Sugahara et al. | ............... | 349/58 |
| 7,463,490 B2 * | 12/2008 | Kim et al. | ..................... | 361/752 |
| 7,697,275 B2 * | 4/2010 | Chen et al. | .................. | 361/679.3 |
| 7,840,241 B2 * | 11/2010 | Kim | ........................ | 455/575.1 |
| 7,859,831 B2 * | 12/2010 | Nakanishi et al. | ....... | 361/679.24 |
| 7,864,260 B2 * | 1/2011 | Lee et al. | ......................... | 349/58 |
| 7,911,774 B2 * | 3/2011 | Nakanishi et al. | ....... | 361/679.21 |
| 8,023,260 B2 * | 9/2011 | Filson et al. | ............. | 361/679.55 |
| 8,238,089 B2 * | 8/2012 | Kim et al. | .................. | 361/679.3 |
| 8,264,837 B2 * | 9/2012 | Pakula et al. | ............ | 361/679.58 |
| 8,345,414 B2 * | 1/2013 | Mooring et al. | ......... | 361/679.21 |
| 8,395,720 B2 * | 3/2013 | Lim | ................................ | 349/58 |
| 8,446,740 B2 * | 5/2013 | Yoshida | ........................ | 361/829 |
| 8,542,481 B2 * | 9/2013 | Lim et al. | ................. | 361/679.26 |
| 8,701,279 B2 * | 4/2014 | Filson et al. | .................... | 29/830 |

(Continued)

FOREIGN PATENT DOCUMENTS

| | | |
|---|---|---|
| EP | 1633176 A1 | 3/2006 |
| EP | 2066162 A1 | 6/2009 |

(Continued)

*Primary Examiner* — Patrick Hawn
(74) *Attorney, Agent, or Firm* — Jefferson IP Law, LLP (57) ABSTRACT

A display module fixing apparatus used in a portable terminal such as a smart phone, a tablet Personal Computer (PC), or the like is provided. The fixing apparatus includes a display module bracket comprising an opening in a predetermined shape and a slim plate integrally fixed to the display module bracket into the opening. Therefore, the portable terminal using the display module fixing apparatus achieves slimness thereof.

21 Claims, 11 Drawing Sheets

(56) References Cited

U.S. PATENT DOCUMENTS

| | | | |
|---|---|---|---|
| 2003/0223020 A1* | 12/2003 | Lee | 349/58 |
| 2006/0181841 A1* | 8/2006 | Chen et al. | 361/680 |
| 2007/0046859 A1* | 3/2007 | Huang et al. | 349/65 |
| 2008/0002093 A1* | 1/2008 | Kim | 349/58 |
| 2008/0007159 A1* | 1/2008 | Seo et al. | 313/504 |
| 2009/0059502 A1* | 3/2009 | Filson et al. | 361/681 |
| 2009/0122217 A1* | 5/2009 | Chen et al. | 349/58 |
| 2009/0257189 A1* | 10/2009 | Wang et al. | 361/679.56 |
| 2010/0014232 A1* | 1/2010 | Nishimura | 361/679.3 |
| 2010/0029339 A1* | 2/2010 | Kim et al. | 455/566 |
| 2010/0309404 A1* | 12/2010 | Lim | 349/58 |
| 2011/0115744 A1 | 5/2011 | Murayama et al. | |
| 2011/0287818 A1* | 11/2011 | Ikuta | 455/575.1 |
| 2012/0073115 A1* | 3/2012 | Filson et al. | 29/592.1 |
| 2012/0257349 A1* | 10/2012 | Bang et al. | 361/679.55 |
| 2012/0281346 A1* | 11/2012 | Lynch et al. | 361/679.21 |
| 2013/0053110 A1* | 2/2013 | Pope et al. | 455/572 |
| 2013/0058039 A1* | 3/2013 | Lee | 361/690 |
| 2014/0168870 A1* | 6/2014 | Cho et al. | 361/679.01 |

FOREIGN PATENT DOCUMENTS

| | | |
|---|---|---|
| EP | 2 262 203 A1 | 12/2010 |
| JP | 2007-033564 A | 2/2007 |
| JP | 2007-121594 A | 5/2007 |
| KR | 10-2010-0012086 A | 2/2010 |
| KR | 10-2010-0014028 A | 2/2010 |
| KR | 10-2011-0101940 A | 9/2011 |

\* cited by examiner

SLIM-TYPE DISPLAY MODULE FIXING APPARATUS FOR PORTABLE TERMINAL

PRIORITY

This application claims the benefit under 35 U.S.C. §119(a) of a Korean patent application filed in the Korean Intellectual Property Office on Sep. 19, 2011 and assigned Serial No. 10-2011-0094074, and a Korean patent application filed in the Korean Intellectual Property Office on Aug. 29, 2012 and assigned Serial No. 10-2012-0094997, the entire disclosure of each of which is hereby incorporated by reference.

BACKGROUND OF THE INVENTION

1. Field of the Invention

The present invention relates to a portable terminal such as a smart phone, a tablet Personal Computer (PC), a notebook, or the like. More particularly, the present invention relates to achieving slimness of a fixing apparatus for a display module mounted on a portable terminal.

2. Description of the Related Art

Generally, portable terminals tend toward slimness and lightweightness for handiness to carry, and the number and variety of users of portable terminals having multimedia functions such as smart phones, tablet Personal Computers (PCs), and the like, are ever increasing. Therefore, the slimness or lightweightness of the portable terminal is recognized as an important characteristic.

There are a variety of methods for achieving slimness of a portable terminal For example, a representative method for achieving slimness of a portable terminal is to achieve slimness of a display module which occupies a large part of a portable terminal mounting space. Another representative method for achieving slimness of a portable terminal is to achieve slimness of a fixing apparatus for mounting the display module.

Figure 1:
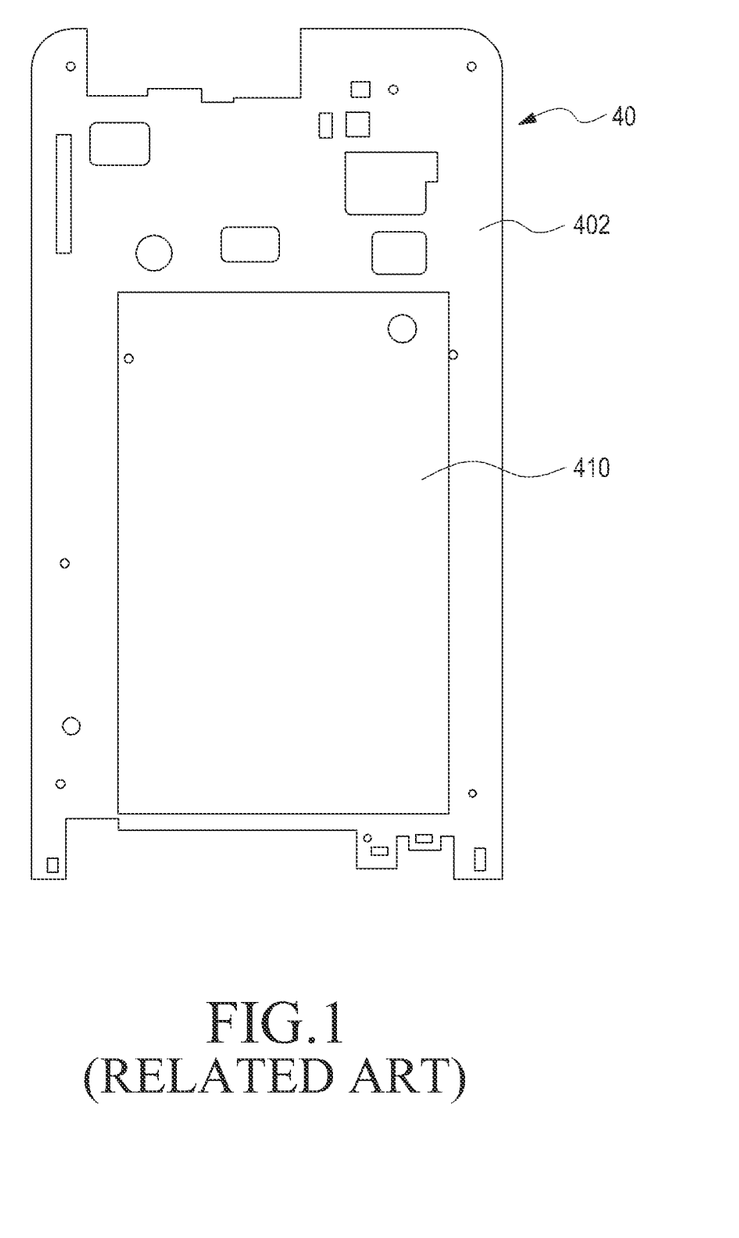
FIG. 1 is a plane view showing a display module bracket according to the related art.
Figure 2:
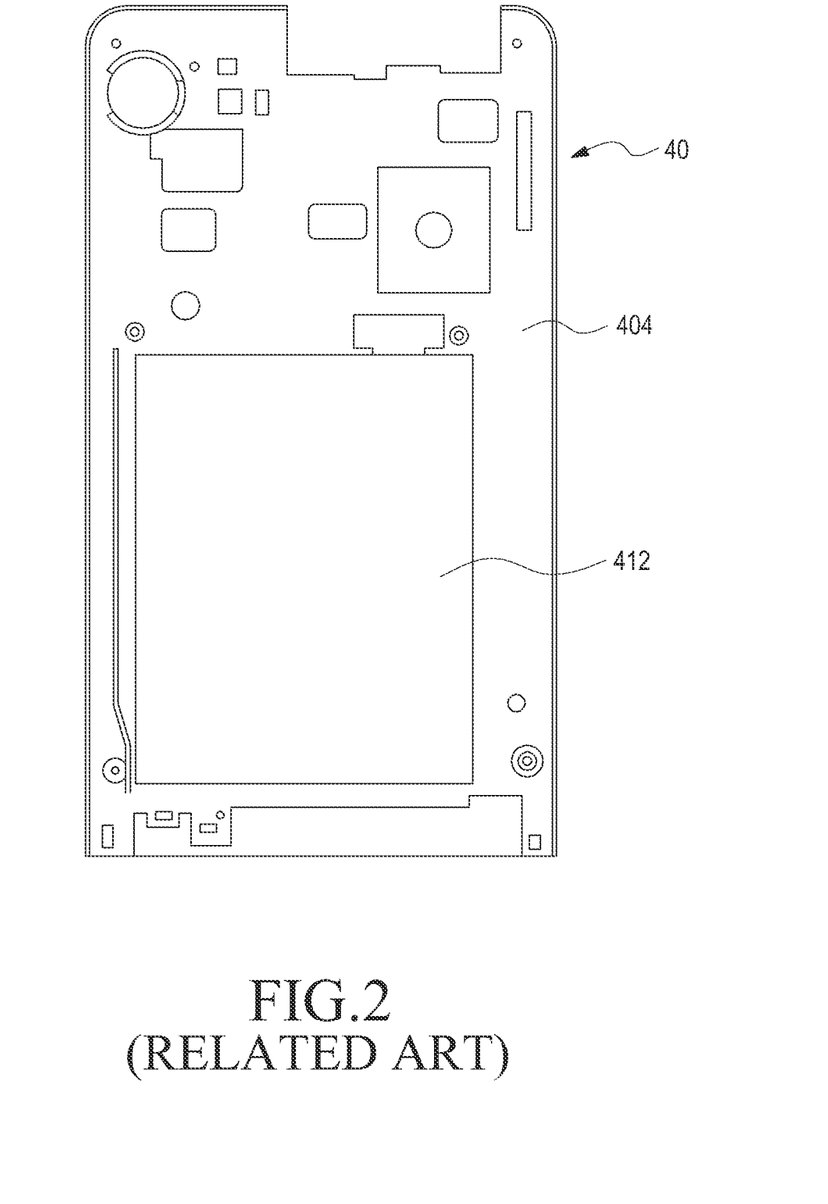
FIG. 2 is a bottom view showing a display module bracket according to the related art.

FIG. 1 is a plane view showing a display module bracket according to the related art. FIG. 2 is a bottom view showing a display module bracket according to the related art. For example, FIGS. 1 and 2 are diagrams showing a display module bracket 40 according to the related on which a display module is mounted.

Referring to FIG. 1, according to the related art, the display module is disposed in a predetermined position 410 on a top surface 402 of the display module bracket 40. Also, referring to FIG. 2, a battery pack (not shown) is disposed in a predetermined position 412 on a bottom surface 404 of the display module bracket 40.

According to the related art, the display module bracket 40 is molded by die-casting, and can be manufactured taking a basic thickness of at least 0.5 mm into consideration. For example, the related-art display module bracket 40 is manufactured to have a thickness of 0.5 mm or more for some reasons in manufacturing processing.

The related art display module bracket 40 may be manufactured by injection-molding. However, by manufacturing the display module bracket 40 by injection-molding, the display module bracket 40 is manufactured to have a basic thickness of 0.5 mm or more. The mentioned thickness refers to a thickness of regions 410, 412 of the display module bracket 40 on which the display module is disposed.

If the related-art display module bracket 40 is manufactured to have a thickness of 0.5 mm or less, it is not possible to secure a requisite strength or a requisite flatness of the display module bracket 40. In addition, flatness management is also difficult to perform, eventually making it difficult to secure strength for fixing the display module.

Another display module mounting structure according to the related art is disclosed in Japanese Patent Application Publication No. JP 2007-121594.

On a bottom surface of the display module bracket is provided a predetermined position for mounting a battery, as described above. Recently, users often use wireless Internet for a long time while carrying a portable terminal or use multimedia such as music, moving pictures, and the like, for a long time. Thus, a battery for supplying power to the portable terminal is provided. However, as various services become available through the portable terminal, a need for a battery which can be used for a long time is increasing.

However, a predetermined thickness for securing the strength of a display module bracket is required, and a space is difficult to secure due to various internal circuits, thereby limiting a battery mounting space and thus reducing the size of the battery. As the size of the battery is limited, an operating time of the portable terminal is shortened.

Therefore, there is an increasing need for a portable terminal capable of providing a battery having an increased capacity by increasing the size of the battery through expansion of the battery mounting space. Therefore, there is a need for an apparatus and method for achieving slimness of a fixing apparatus for a display module mounted on a portable terminal.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present invention are to address at least the above-mentioned problems and/or disadvantages and to provide at least the advantages described below. Accordingly, an aspect of the present invention is to provide a display module fixing apparatus for mounting a display module in a slim fashion.

Another aspect of the present invention is to provide a display module fixing apparatus capable of maintaining mounting strength and flatness while achieving slimness of the display module fixing apparatus.

Another aspect of the present invention is to provide a display module fixing apparatus capable of reinforcing mounting strength or adjusting flatness for a display module.

Another aspect of the present invention is to provide a display module fixing apparatus which includes a large-capacity battery by expanding a battery mounting space, while securing strength of a portable terminal.

In accordance with an aspect of the present invention, a display module fixing apparatus for a portable terminal is provided. The display module fixing apparatus includes a display module bracket including an opening in a predetermined shape, and a slim plate integrally fixed to the display module bracket into the opening.

In accordance with another aspect of the present invention, a display module fixing apparatus for a portable terminal is provided. The display module fixing apparatus includes a display module bracket including an opening in a predetermined shape, a bonding surface formed along a circumference of the opening, and a support plate provided in the opening to cover the opening and coupled to the bonding surface to increase a strength of the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a display module fixing apparatus (e.g., 'fixing apparatus' for short) according to exemplary embodiments of the present invention will be described with reference to the accompanying drawings. Like reference numerals refer to like components. A display module is not shown in the drawings.

Figure 3:
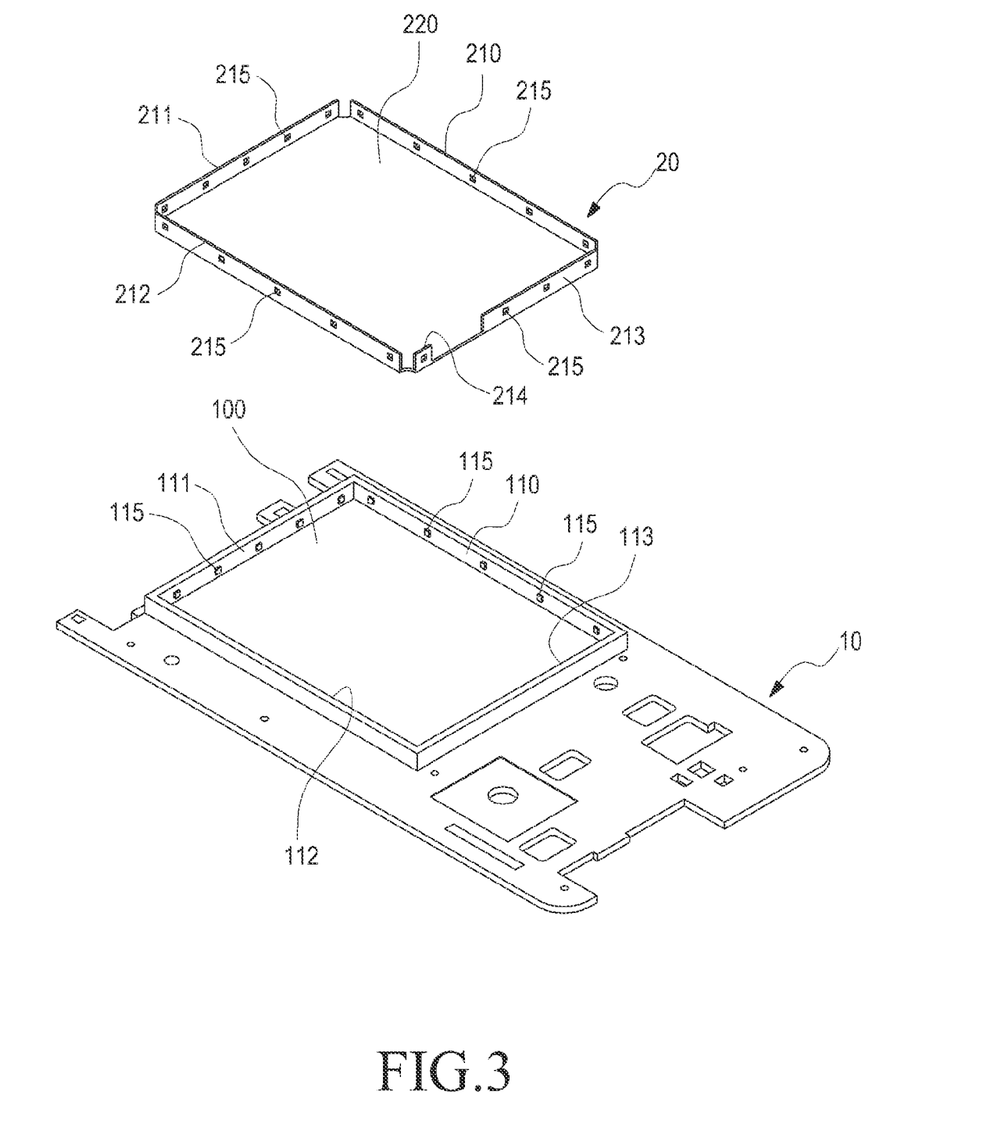
FIG. 3 is an exploded perspective view showing a display module fixing apparatus in which a slim plate has not yet been press-fitted into a display module bracket according to an exemplary embodiment of the present invention.
Figure 4:
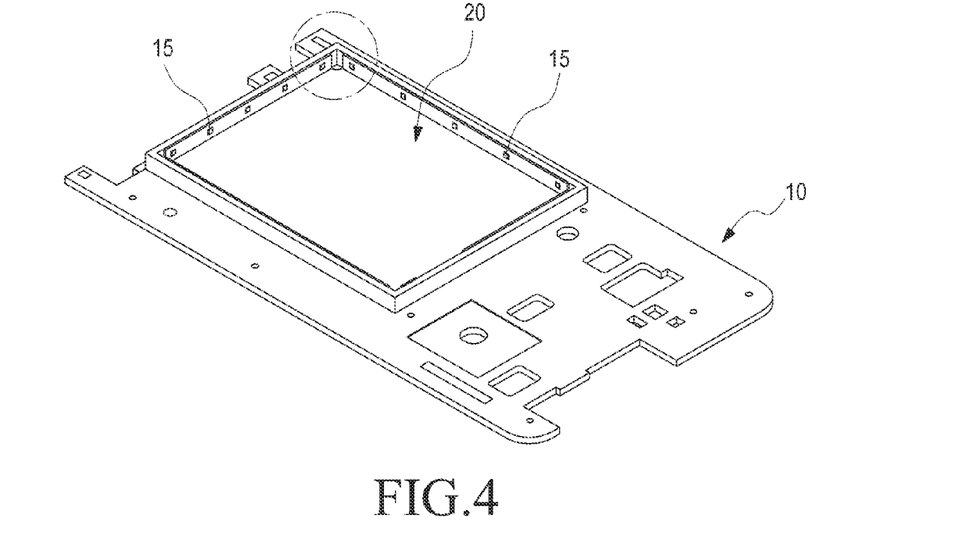
FIG. 4 is a perspective view showing a state in which a slim plate is completely press-fitted into a display module bracket according to an exemplary embodiment of the present invention.

FIG. 3 is an exploded perspective view showing a display module fixing apparatus in which a slim plate has not yet been press-fitted into a display module bracket according to an exemplary embodiment of the present invention. FIG. 4 is a perspective view showing a state in which a slim plate is completely press-fitted into a display module bracket according to an exemplary embodiment of the present invention.

Referring to FIG. 3, a display module fixing apparatus is shown in a state before a slim plate is press-fitted to a display module bracket according to an exemplary embodiment of the present invention. Referring to FIG. 4, a display module fixing apparatus is shown in a state after the slim plate is press-fitted into the display module bracket according to an exemplary embodiment of the present invention. As shown in FIGS. 3 and 4, the fixing apparatus is adopted to achieve slimness of a fixing structure for a display module (not shown) in a portable terminal which pursues slimness, such as a smart phone, a tablet Personal Computer (PC), a notebook, or the like. The portable terminal has disposed thereon a display in a predetermined position of a body of the portable terminal, and slimness of the display module fixing apparatus is favorable to slimness of a body casing (shown in FIG. 6), and eventually to slimness of the portable terminal. According to the related art, a stacked structure is provided such that the display module is fixed to the display module bracket in parallel therewith. However, in an exemplary embodiment of the present invention, the fixing apparatus press-fits a separate slim plate 20 into a display module bracket 10 such that the slim plate 20 is completely received in the display module bracket 10, and the slim plate 20 is formed of a material having separate strength, thereby pursuing slimness of the fixing apparatus while maintaining mounting strength. The aforementioned display module refers to a Liquid Crystal Display (LCD) module, but it is not necessarily limited to the LCD module and may be applied to any display device capable of displaying various data. The press-fit processing of the slim plate 20 is performed using a press jig (not shown).

The fixing apparatus may include the display module bracket 10 (e.g., 'bracket' for short) and the slim plate 20. The bracket 10 is manufactured by die casting, and may include an opening 100 in a predetermined shape. The opening 100 is a space in which the slim plate 20 is inserted and mounted integrally. The opening 100 is open vertically upward and downward and is closed on four horizontal sides such that the opening 100 includes four inner walls 110 through 113. The slim plate 20 is formed of a material different from the bracket 10 such as, for example, a Set-Up Standard (SUS) material. The SUS material is of a thin film type (e.g., with a thickness of 0.3 mm or less), and is useful for achieving thin thickness while maintaining strength. The slim plate 20 is fixed integrally to the bracket 10 by being press-fitted into the opening 100.

The slim plate 20 includes a plurality of holding portions 210 through 214 along a circumference thereof to be inserted into the opening 100. The plurality of holding portions 210 through 214 are formed to be bent vertically upward from a slim plate bottom 220, and may include a first holding portion 211, second holding portions 213 and 214, a third holding portion 210, and a fourth holding portion 212. The first holding portion 211 and second holding portions 213 and 214 are disposed to face each other, and extend linearly on the edge (along the circumference) of the slim plate bottom 220. The third and fourth holding portions 210 and 212 are formed between the first holding portion 211 and second holding portions 213 and 214 to face each other and extend linearly on the edge (along the circumference) of the slim plate bottom 220. The holding portions 210 through 214 are described above as being formed to be bent, and according to bending angles of the holding portions 210 through 214 formed in manufacturing of the holding portions 210 through 214, the fixing strength of the slim plate 20 may be reinforced or flatness of the slim plate 20 may be maintained or adjusted. A general SUS material is a metallic material of a thin film type, and is useful because the elasticity of each of the holding portions 210 through 214 can be adjusted according to the bending angle of each holding portion. The bending angle of each holding portion may be considered also to improve assembly.

Preferably, a plurality of coupling portions 15 are further provided between the bracket 10 and the plurality of holding portions 210 through 214. The plurality of coupling portions 15 are provided to coupling strength of the slim plate 20 press-fitted into the bracket 10 and to maintain flatness of the slim plate 20 (e.g., display module), and may include or otherwise correspond to a plurality of openings 215 and a plurality of protrusions 115. The plurality of openings 215 are provided at equal intervals along each of the plurality of holding portions 210 through 214. The plurality of protrusions 115 are provided at equal intervals along each of the inner walls 110 through 113 of the bracket 10 and are inserted into the plurality of openings 215. The respective protrusions 115 protrude from the inner walls 110 through 113 in a horizontal direction, especially in directions to face each other, such that they are inserted into their facing openings 215 in press-fit processing. Once the slim plate 20 is completely press-fitted and fixed into the bracket 10, the slim plate 20 is received in the bracket 10 in parallel therewith.

Figure 5:
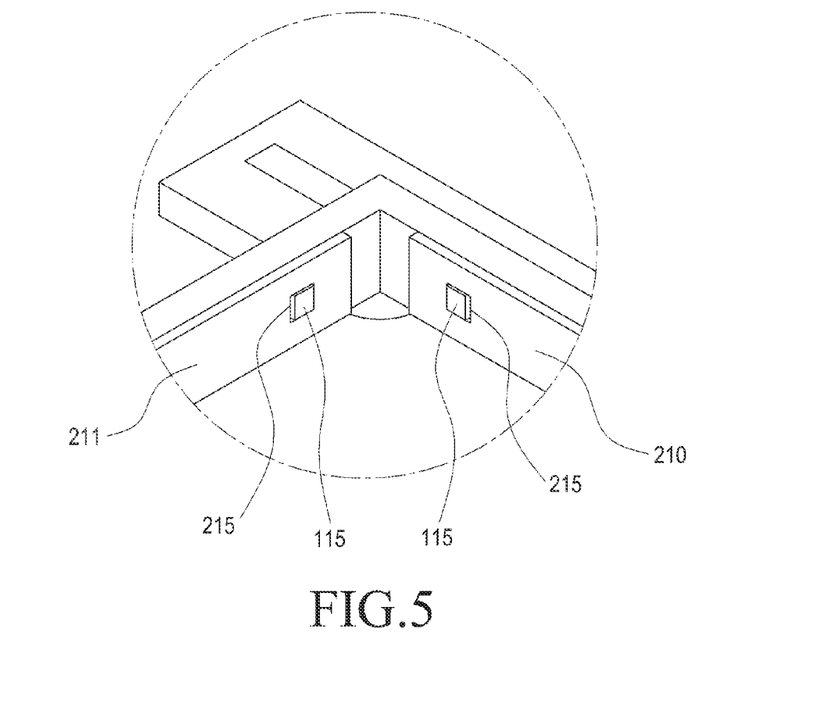
FIG. 5 is a perspective view showing enlargement of a portion of FIG. 4 according to an exemplary embodiment of the present invention.

FIG. 5 is a perspective view showing enlargement of a portion of FIG. 4 according to an exemplary embodiment of the present invention.

Referring to FIG. 5, a display module fixing apparatus is shown in a state in which the plurality of protrusions 115 are completely inserted and coupled to the plurality of openings 215 provided in the respective holding portions 210 and 211 according to an exemplary embodiment of the present invention.

Figure 6:
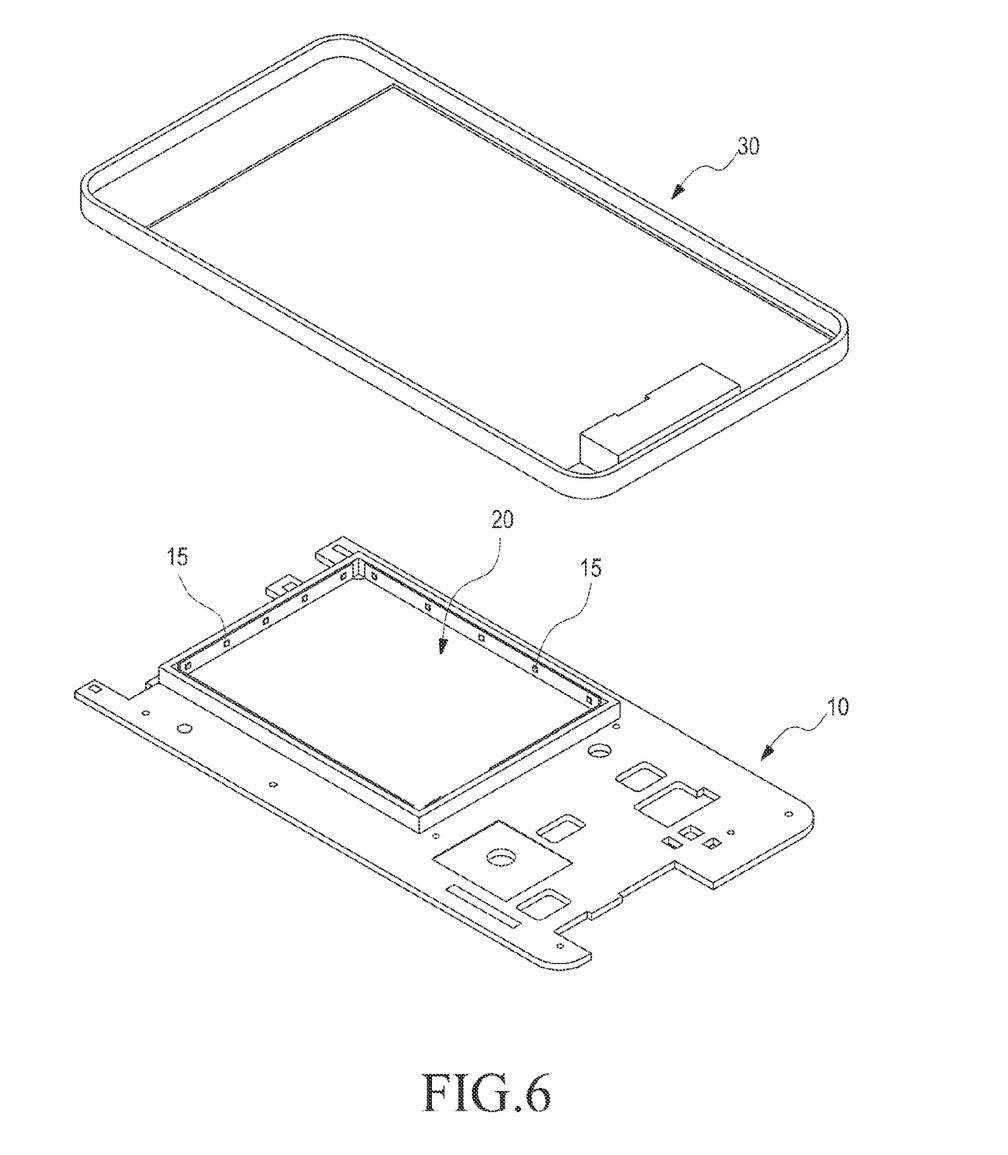
FIG. 6 is an exploded perspective view showing a state in which a display module bracket into which a slim plate is press-fitted has not yet been insert-injected to a casing according to an exemplary embodiment of the present invention.

Referring to FIG. 6, when the slim plate 20 is completely coupled to the bracket 10 by press-fit processing, the slim plate 20 is molded into a portable terminal casing 30 by insert-injection. A portable terminal includes an upper casing and a lower casing, on one of which the fixing apparatus may be adopted. According to exemplary embodiments to the present invention in which the portable terminal is a smart phone or a tablet PC, the fixing apparatus is configured on the upper casing 30.

The fixing apparatus according to exemplary embodiments of the present invention is of a thin film type and uses properties of a SUS material favorable to strength reinforcement. Because the fixing apparatus is of a thin film type, implementation of such a fixing apparatus in a display module fixing apparatus, contributes to slimness of the portable terminal.

Hereinafter, with reference to FIGS. 7 through 16, a detailed description will be made of a display module fixing apparatus capable of achieving slimness of a portable terminal, more specifically, the display module fixing apparatus, expanding a battery mounting space, and increasing strength according to an exemplary embodiment of the present invention. For clarity and convenience of the description, thicknesses of lines or sizes of components shown in the drawings may be shown as being exaggerated or not to scale. In addition, the same structure as in the display module fixing apparatus for the portable terminal described above will be referred to as the same reference numeral, and a description thereof will be substituted by the above description. Although ordinal numbers such as "first", "second", and so forth will be used in an exemplary embodiment of the present invention described below, such numbers are merely intended to distinguish objects having the same name, the order of such referenced objects may be set arbitrarily, and the preceding description of an object may be applied to a next-order object.

In the following description, with respect to the display module fixing apparatus (e.g., 'bracket' for short), a position in which the display module of the portable terminal is mounted will be referred to as a top surface and a position in which the battery and the lower casing are mounted will be referred to as a bottom surface. In the current exemplary embodiment of the present invention, the bracket is manufactured to have a slim shape for slimness of the portable terminal and to have an opening therein for improvement of the degraded strength of the bracket and further the entire strength of the portable terminal. In addition, the bracket is provided in such a way that a space of an opening in which the battery is mounted can be expanded as much as possible.

Figure 7:
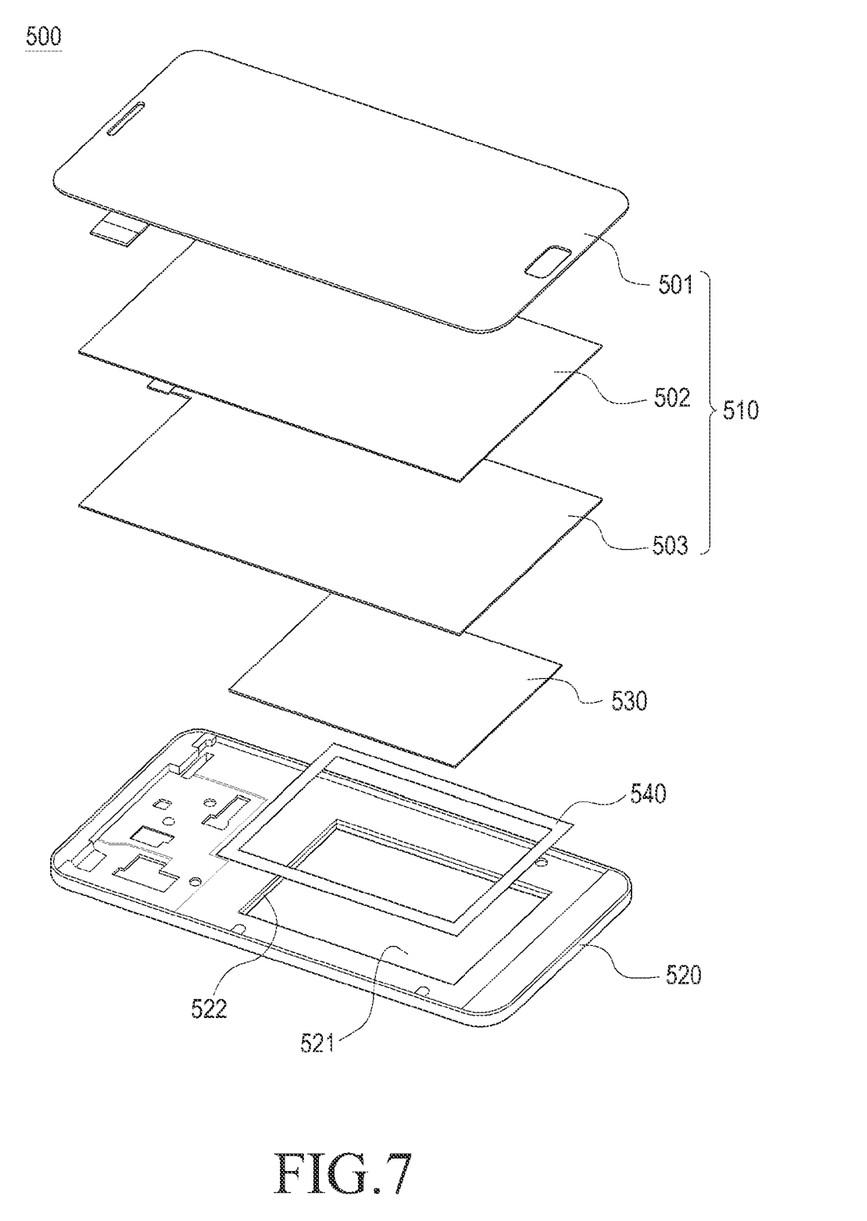
FIG. 7 is a diagram schematically showing a bracket and components of a portable terminal provided on a top surface of the bracket according to a second exemplary embodiment of the present invention.
Figure 8:
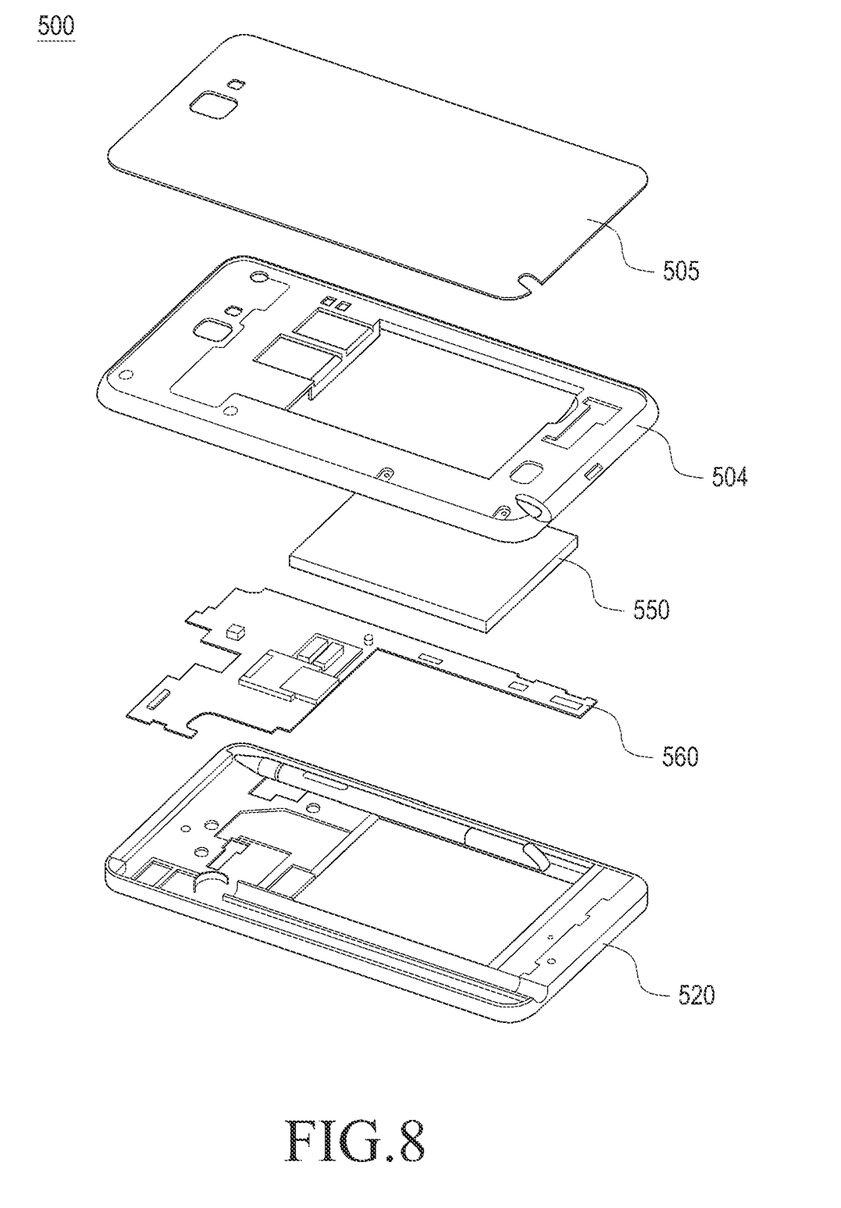
FIG. 8 is a diagram schematically showing components provided on a bottom surface of a bracket having mounted thereon a display module such as, for example, the display module in FIG. 7 according to an exemplary embodiment of the present invention.

FIG. 7 is a diagram schematically showing a bracket 520 and components of a portable terminal 500 provided on a top surface of the bracket 520 according to a second exemplary embodiment of the present invention. FIG. 8 is a diagram schematically showing components provided on a bottom surface of the bracket 520 on which a display module 510 is mounted such as, for example, the display module 520 in FIG. 7 according to an exemplary embodiment of the present invention. Referring to FIGS. 7 and 8, the portable terminal 500 may include a body 504, the display module 510, the bracket 520, a support plate 530, a coupling agent 540, and a battery 550. The portable terminal may also include a battery cover 505, and internal circuits 560. In particular, the portable terminal 500 according to an exemplary embodiment of the present invention is, for example, a bar-type terminal, more specifically, a full touch bar type terminal, such that the display module 510 occupies substantially the entire top surface of the bar type terminal. However, the portable terminal 500 is not necessarily limited to that example, and its shape or construction may be freely changed as long as it includes the display module 510, the body 504, the bracket 520, the support plate 530, and the battery 550. The body 504 is a case of the portable terminal 500 and may be divided into an upper casing (not shown) and a lower casing 504. However, in the current exemplary embodiment of the present invention, the display module 510 is formed as the entire front surface and is mounted by the bracket 520 and the lower casing 504. The display module 510 includes an LCD plate 501 containing reinforced glass, such as an LCD or an Active-Matrix Organic Light-Emitting Diode (AMOLED) on the front surface of the portable terminal 500 and a compressive material 502 having elasticity, such as, for example, a sponge, to protect an LCD module from external shocks generated in the LCD plate 501 on a back surface of the LCD plate 501. On a rear surface of the compressive material 502 is positioned an EMR sheet 503 for recognizing a contact object such as an S-PEN or stylus device, such that in case of generation of a touch on the LCD plate 501, an input corresponding to the touch is possible. Reference 505 of FIG. 5 corresponds to a battery cover that covers the lower casing 504.

Figure 9:
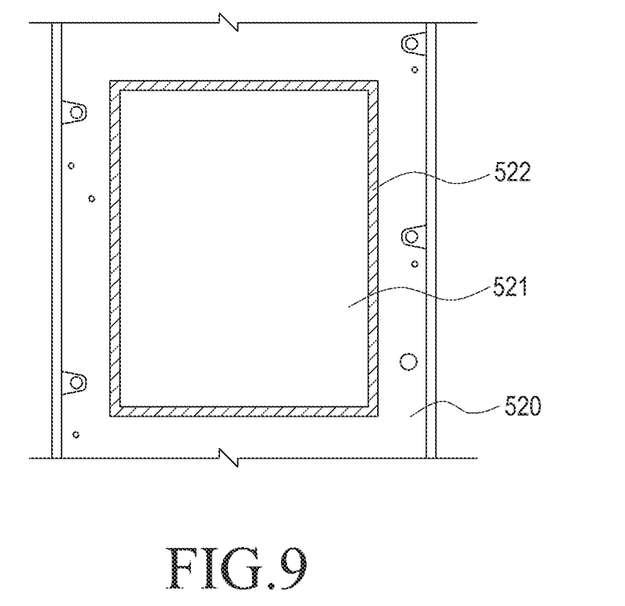
FIG. 9 is a diagram showing enlargement of an opening of a bracket such as, for example, the bracket in FIG. 7 according to an exemplary embodiment of the present invention.
Figure 10:
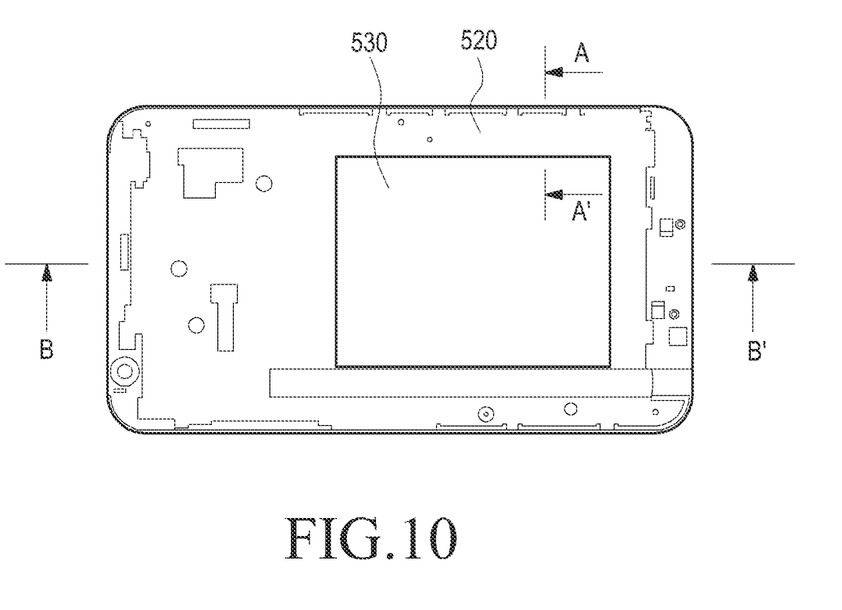
FIG. 10 is a diagram showing a bracket having mounted thereon a display module such as, for example, the display module in FIG. 7 according to an exemplary embodiment of the present invention.

FIG. 9 is a diagram showing enlargement of an opening 521 of a bracket such as, for example, the bracket 520 in FIG. 7 according to an exemplary embodiment of the present invention. FIG. 10 is a diagram showing a bracket such as, for example, the bracket 520 having mounted thereon a display module, such as for example, the display module 510 in FIG. 7 according to an exemplary embodiment of the present invention.

Referring to FIGS. 9 and 10, the bracket 520 is provided between the display module 510 and the lower casing 504 to fix and support positions of circuits 560 provided in the body 504 and also support the strength of the body 504. For example, the bracket 520 is provided on the rear surface of the display module 510 to mount the display module 510 thereon and reinforce the strength of the portable terminal 500. To reinforce the strength of the portable terminal 500, the bracket 520 may include at least one of STS, Mg, and Al, or may include at least one of Polycarbonate (PC)+Glass Fiber (GF), PC, and PC+Acrylonitrile-Butadiene-Styrene (ABS). For example, the bracket 520 prevents damages of the display module 510 and the internal circuits 560 and improves the strength of the body 504 against generation of shocks or a torsion caused by dropping of the portable terminal 500 or the like. In addition, the bracket 520 according to exemplary embodiments of the present invention has formed therein the opening 521 as a space on which the battery 550 is mounted. The opening 521 is a through hole which passes through the front and rear surfaces of the bracket 520 and has a size of about 70% or more of the bracket 520 to achieve slimness of the thickness of the battery 550 when the battery 550 is mounted. As a result, due to the opening 521 formed in the bracket 520, the original function of the bracket 520 (i.e., the function of supporting the body 504), may not be achieved properly. Therefore, the support plate 530 of a thin film type is provided to cover the opening 521. To allow the support plate 530 to be mounted on and coupled to the opening 521, a bonding surface 522 on which the support plate 530 is mounted is formed along the circumference of the opening 521.

Figure 11:
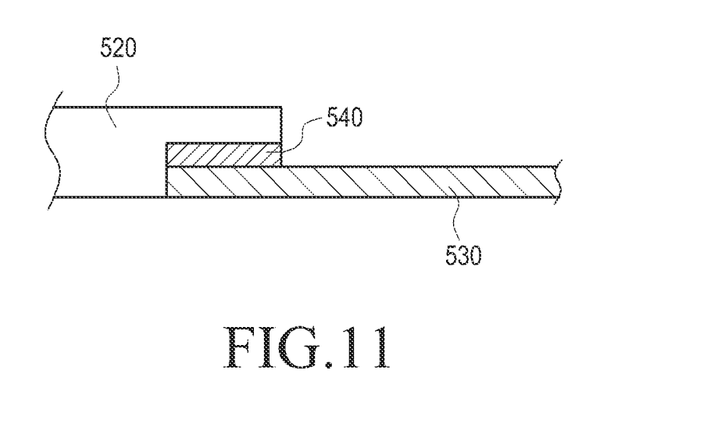
FIG. 11 is a cross-sectional view taken along a line A-A' in FIG. 10 according to an exemplary embodiment of the present invention.
Figure 12:
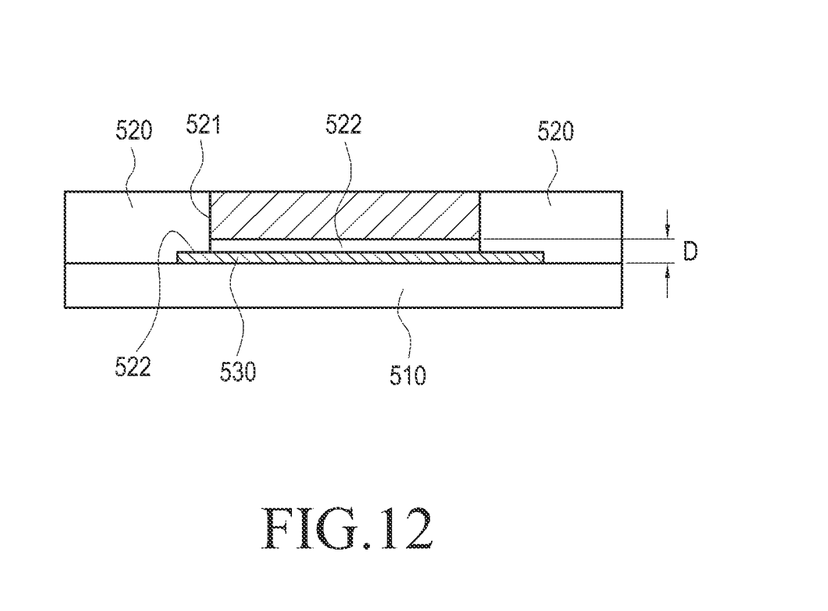
FIG. 12 is a cross-sectional view taken along a line B-B' in FIG. 10 according to an exemplary embodiment of the present invention.

FIG. 11 is a cross-sectional view taken along a line A-A' in FIG. 10 according to an exemplary embodiment of the present invention. FIG. 12 is a cross-sectional view taken along a line B-B' in FIG. 10 according to an exemplary embodiment of the present invention.

Referring to FIGS. 11 and 12, the bonding surface 522 is a surface of the bracket 520, more specifically, the surface of the bracket 520 on which the display module 510 is mounted, and is formed along the circumference of the opening 521. The bonding surface 522 is recessed to a predetermined depth toward the battery 550 to allow the support plate 530 to be settled thereon. The bonding surface 522 is formed with an area to be sufficiently coupled with the circumference of the support plate 530. When the support plate 530 is coupled to the bonding surface 522, a surface of the support plate 530 has the same height as a surface of the bracket 520. For example, the thickness of the support plate 530 and the thickness of the bonding surface 522 are almost equal to each other, such that the strength of the bracket 520 degraded due to formation of the opening 521 can be reinforced and the thickness of the opening 521 can be increased by a predetermined height (e.g., 0.2-0.5 mm or more, when compared to cases according to the related art). More specifically, the thickness of the bracket 520 of the slim-type portable terminal 500 provided is about 0.4-0.5 mm, and the support plate 530 is formed as a thin-film plate having a thickness of about 0.1 mm. Thus, the recessed thickness of the bonding surface 522 of the bracket 520 is about 0.1 mm, and once the support plate 530 is mounted on the bonding surface 522, it forms the same plane as the bracket 520. As a result, when the support plate 530 is mounted, the thickness of the opening 521 may be increased by 0.3-0.4 mm or more in comparison to when a bottom surface is used. However, such a structure corresponds to the slim-type portable terminal 500 provided recently, and the thickness is not limited to the aforementioned example. In other words, depending on the thickness of the portable terminal 500, and the thicknesses of the bracket 520 and the support plate 530 provided therein, the increased thickness of the opening 521 may be freely changed, as long as the thickness of the opening 521 is increased and thus the thickness of the battery 550 mounted on the opening 521 is also increased.

The battery 550 is mounted on the other surface of the opening 521 whose surface is covered by the support plate 530. For example, on the front surface of the bracket 520, the support plate 530 is mounted on the bonding surface 522 in such a way to cover the opening 521; on the rear surface of the bracket 520, the battery 550 is mounted on the opening 521. As mentioned previously, the support plate 530 is a thin-film plate, and may further have a space of about 0.2-0.5 mm when compared to a battery mounting space formed merely with a groove, such that the size of the battery 550 can be increased by the area of the space. Therefore, for the portable terminal 500, especially, the portable terminal 500 of a full touch bar type, slimness can be achieved and the mounting space for the battery 550 can be expanded within a limited space of the slim-type portable terminal 500, and by the expanded mounting space, the size of the battery 500 can be increased, thus increasing the capacity of the battery 550. Consequently, the operating time of the portable terminal 500 can be lengthened by the increased capacity of the battery 550.

The support plate 530 may include both a material which is the same as and a material which is different from that of the bracket 520. For example, when the bracket 520 is formed of a metallic material such as STS, Mg, or Al or a material such as PC+GF, PC, or PC+ABS, the support plate 530 is formed as a thin-film plate which includes a metallic material such as STS, Mg, or Al, a material such as a PC sheet, Carbon Fiber Reinforced Plastic (CFRP), or a fiber reinforced plastics material such as CFRP to increase the reinforcing force of the bracket 520 and increase a space of the opening 521 when being provided in the opening 521 formed in the bracket 520. On the bonding surface 522 is provided the coupling agent 540 to allow the circumference of the support plate 530 to be engaged to the bonding surface 522. The coupling agent 540 is of a liquid type such as glue, but may include a material such as a thermal-bonding adhesive tape or a general tape. However, the coupling agent 540 is not limited to this example. Various coupling methods may be used, such that for example, by compressing the bonding surface 522 and the circumference of the support plate 530 facing the bonding surface 522, the bonding surface 522 and the circumference of the support plate 530 may be adhered to each other by compression heat.

In this way, the slim-type portable terminal 500 can be implemented, and the capacity of the battery 550 can be increased through increase in the mounting space of the battery 550 and the resulting increase in the size of the battery 550, such that the operating time of the portable terminal 500 can be lengthened.

Brackets 520a and 520b to be described with reference to FIGS. 13 through 16 correspond to two exemplary embodiments of the present invention which expand a contact area to improve an engaging force when support plates 530a and 530b are engaged to the bonding surface 522. Therefore, the above description is equally applied to other components, and an additional description will be provided only for some portions which are different from the above description.

Figure 13:
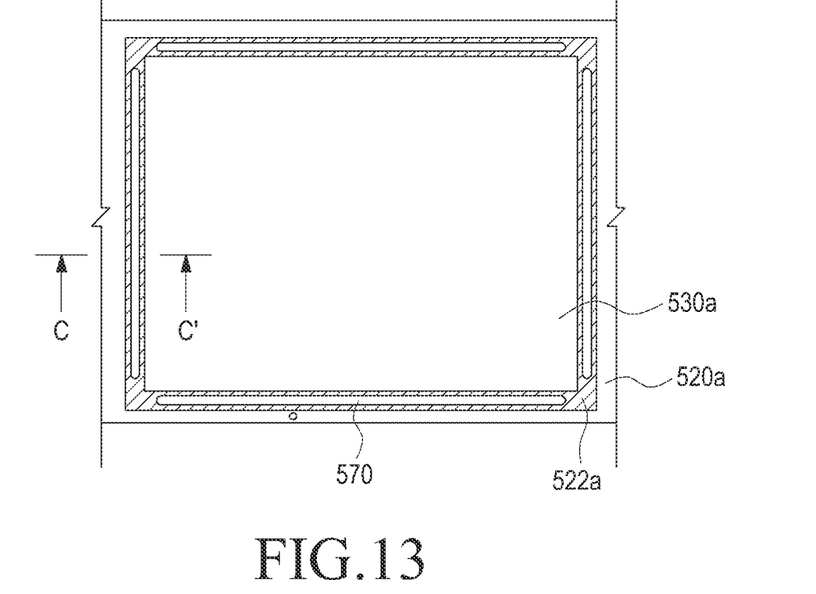
FIG. 13 is a diagram showing another example in which a contact area between a support plate and a bonding surface is increased relative to the contact area in FIG. 9 according to an exemplary embodiment of the present invention.
Figure 14:
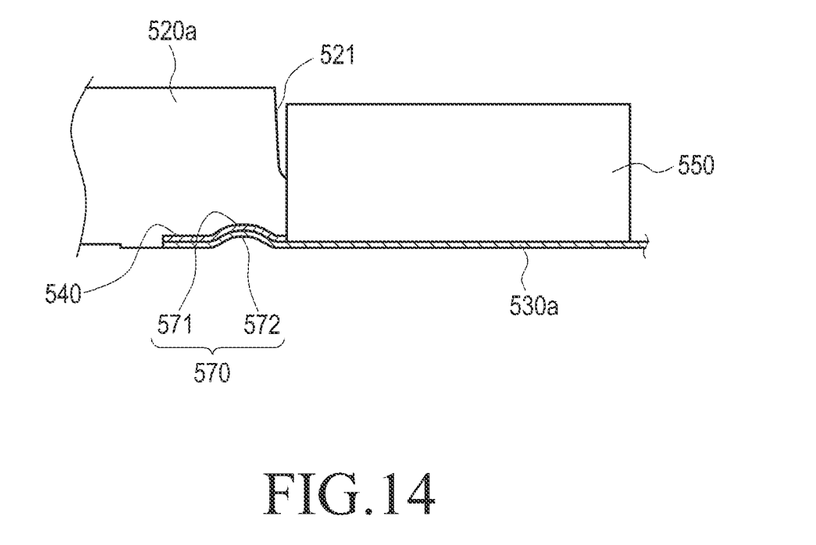
FIG. 14 is a cross-sectional view taken along a line C-C' in FIG. 13 according to an exemplary embodiment of the present invention.

FIG. 13 is a diagram showing another example in which a contact area between the support plate 530 and the bonding surface 522 is increased relative to the contact area in FIG. 9 according to an exemplary embodiment of the present invention. FIG. 14 is a cross-sectional view taken along a line C-C' in FIG. 13 according to an exemplary embodiment of the present invention.

Referring to FIGS. 13 and 14, a concave surface portion 570 is formed to improve a bonding force between the support plate 530a and a bonding surface 522a and to increase a bonded area therebetween when the support plate 530a is engaged to the bonding surface 522a. In particular, the concave surface portion 570 is formed long in a lengthwise direction of the bonding surface 522a, and as in the current exemplary embodiment of the present invention, when the bonding surface 522a has four sides, one concave surface portion 570 is formed on each side. The concave surface portion 570 may include a first concave surface portion 571 and a second concave surface portion 572. The first concave surface portion 571 is provided along the lengthwise direction of the bonding surface 522a, and is recessed toward the battery 550 from the bonding surface 522a, such that it has a concave shape. The second concave surface portion 572 is formed on the circumference of the support plate 530a to have a shape engaged to the first concave surface portion 571. For example, the second concave surface portion 572 is formed on a surface facing the bonding surface 522a along the circumference of the support plate 530a, and is recessed in a direction in which the battery 550 is mounted to be coupled in an engaged manner with the first concave surface portion 571, such that the second concave surface portion 572 has a concave shape. Therefore, when the circumference of the support plate 530a is engaged to the bonding surface 522a by the coupling agent 540, the second concave surface portion 572 is coupled in an engaged manner with the first concave surface portion 571. Consequently, a coupled area is increased and thus a coupling force can be increased.

Figure 15:
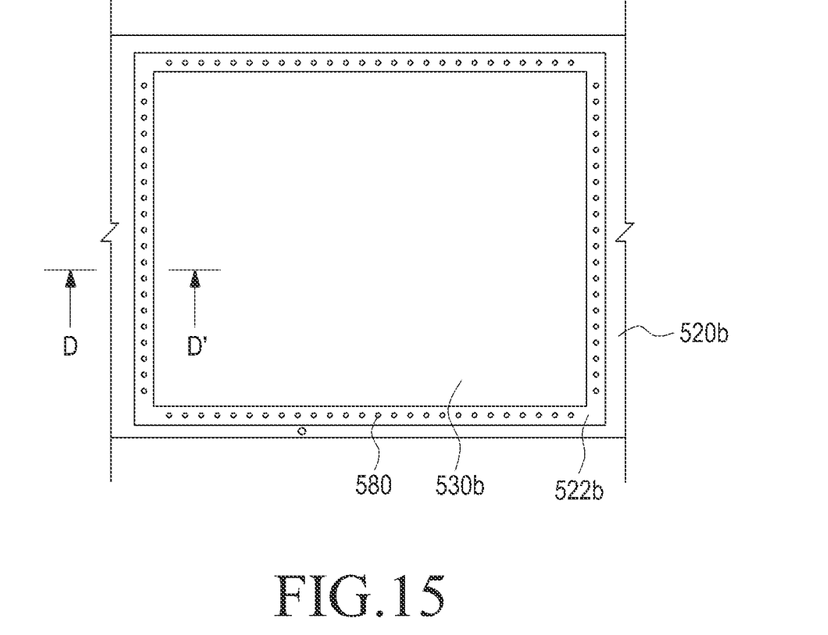
FIG. 15 is a diagram showing further another example in which a contact area between a support plate and a bonding surface is increased relative to the contact area in FIG. 9 according to an exemplary embodiment of the present invention.
Figure 16:
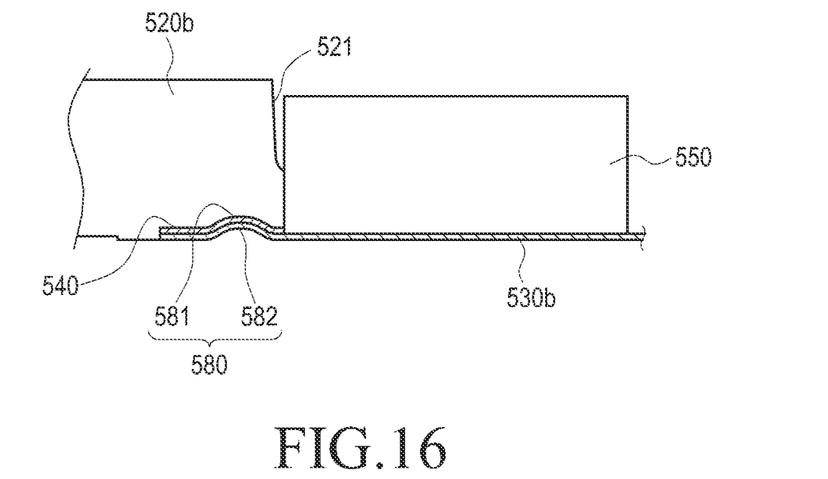
FIG. 16 is a side cross-sectional view taken along a line D-D' in FIG. 15 according to an exemplary embodiment of the present invention.

FIG. 15 is a diagram showing further another example in which a contact area between the support plate 530a and the bonding surface 522a is increased relative to the contact area in FIG. 9 according to an exemplary embodiment of the present invention. FIG. 16 is a side cross-sectional view taken along a line D-D' in FIG. 9 according to an exemplary embodiment of the present invention.

Referring to FIGS. 15 and 16, the concave surface portion 570 is replaced with a plurality of dot portions 580. In other words, in the foregoing exemplary embodiment of the present invention, the concave surface portion 570 is formed on the bonding surface 522a and the circumference of the support plate 530a facing the bonding surface 522a, but in the current exemplary embodiment of the present invention, the plurality of dot portions 580 are formed in place of the concave surface portion 570. More specifically, the plurality of dot portions 580 are formed to improve a bonding force between the support plate 530b and the bonding surface 522b and increase an area of the bonding surface 522b. The plurality of dot portions 580 may include a plurality of first dot portions 581 and a plurality of second dot portions 582. The plurality of first dot portions 581 are formed in adjacent to each other with a space therebetween along a lengthwise direction of the bonding surface 522b. The plurality of second dot portions 582 are formed to be engaged with the plurality of first dot portions 581 in adjacent to each other with a space therebetween along the circumferential lengthwise direction of the support plate 530b. Thus, when the support plate 530b is coupled in an engaged manner with the bonding surface 522b by the coupling agent 540, the plurality of second dot portions 582 are coupled in an engaged manner with the plurality of first dot portions 581. Subsequently, a coupled area is increased and a coupling force may also be increased.

As mentioned previously, the support plate 530 is coupled to the fixing apparatus for the display module 510 such as, for example, the bracket 520, according to the second exemplary embodiment of the present invention, the strength of the bracket 520 degraded by the large opening 521 can be improved by 50% or more in relative to a simple fixing structure and the strength of the portable terminal 500 can also be improved by 30% or more in relative to the simple fixing structure. In the current exemplary embodiment of the present invention, the thickness of the bottom surface of the bracket 520 is assumed to be 0.4-0.5 mm, for example, and thus the support plate 530 of a thin film type is assumed to have a thickness of about 0.1 mm. As a result, when compared to a case in which a battery mounting space in a shape such as a groove is formed using the bracket 520, a space of about 0.3-0.4 mm is further generated. However, the increased space is not limited to that example, and depending on the thicknesses of the bracket 520 and the support plate 530, the increased space may be 0.1-0.5 mm or more, more specifically, about 0.1-1 mm. Therefore, the size of the battery 550 mounted in the opening 521 can be increased by the increased thickness of the opening 521, improving the operating time of the portable terminal 500.

As is apparent from the foregoing description, the display module fixing apparatus according to exemplary embodiments of the present invention is configured to be slim, contributing to slimness of the portable terminal (e.g., a smart phone or a tablet PC). In particular, the fixing apparatus according to exemplary embodiments of the present invention may achieve a thickness reduction of about 0.1-0.2 mm.

Moreover, the display module fixing apparatus according to exemplary embodiments of the present invention includes a coupling portion to contribute to maintaining mounting strength and flatness of the display module. For example, when only slimness is pursued, the mounting strength and flatness of the display module are degraded. However, according to exemplary embodiments of the present invention, the mounting strength and flatness of the display module can be maintained while pursuing slimness.

Furthermore, by providing a support plate of a thin-film type in an opening of the display module fixing apparatus according to exemplary embodiments of the present invention, the size of the opening, more specifically, the mounting space for the battery, can be increased by a minimum of 0.2-0.5 mm. In addition, the size of the battery can be increased by the increased space, such that the capacity of the battery is increased and thus the operating time of the portable terminal can be lengthened.

While the invention has been shown and described with reference to certain exemplary embodiments thereof, it will be understood by those skilled in the art that various changes in form may be made therein without departing from the spirit and scope of the invention as defined by the appended claims and their equivalents.

What is claimed is:

1. A support apparatus, the support apparatus comprising:
a display module support member comprising an opening in a predetermined shape, the display module support member having a periphery surrounding the opening and a bonding surface formed around at least a part of the circumference of the opening, wherein the bonding surface has a recessed structure; and
a plate provided in the opening to cover the opening, the plate having a flat top surface and a flat bottom surface, wherein the flat bottom surface of the plate is coupled to the bonding surface of the display module support member,
wherein the top surface of the plate is substantially coplanar with the periphery surrounding the opening of the display module support member,
wherein a display module is mounted on a surface of the display module support member and on the flat top surface of the plate,
wherein the bonding surface has a first concave portion formed thereon,
wherein the plate has a second concave portion formed thereon, and
wherein the bonding surface and the plate are coupled so as to engage the first concave portion with the second concave portion.

2. The support apparatus of claim 1, wherein the plate is formed of a thin film type metallic material having a thickness less than or equal to 0.3 mm.

3. The support apparatus of claim 1, wherein the display module support member to which the plate is integrally fixed by press-fit processing is molded integrally to a portable terminal casing by insert-injection processing.

4. The support apparatus of claim 1, wherein the plate is formed of a material different from that of the display module support member.

5. A portable terminal, comprising:
a display module; and
a support apparatus for mounting the display module, wherein the support apparatus comprises:
a display module support member comprising an opening in a predetermined shape and a periphery surrounding the opening;
a bonding surface formed along a circumference of the opening, wherein the bonding surface has a recessed structure; and
a plate provided in the opening to cover the opening, the plate having a flat top surface and a flat bottom surface, wherein the flat bottom surface of the plate is coupled to the bonding surface,
wherein the display module is directly mounted on a surface of the display module support member and on the flat top surface of the plate,
wherein a battery is directly mounted on the flat bottom surface of the plate, and
wherein the top surface of the plate is substantially coplanar with the periphery surrounding the opening of the display module support member.

6. The portable terminal of claim 5, wherein the bonding surface is formed along the circumference of the opening to be recessed from a surface of the display support member.

7. The portable terminal of claim 5, wherein the plate is provided as a thin film, and
wherein a battery is mounted in the opening covered by the plate.

8. The portable terminal of claim 7, wherein a coupling agent for coupling the plate to the bonding surface is provided between the bonding surface and the plate.

9. The portable terminal of claim 8, wherein the coupling agent comprises at least one of a glue, a thermal-bonding adhesive tape, and a tape.

10. The portable terminal of claim 5, wherein a first concave surface portion is formed in the bonding surface to be recessed in a lengthwise direction of the bonding surface, thereby increasing an area coupled with the plate, and
a second concave surface portion is formed on a circumference of the plate to be coupled in an engaged manner with the first concave surface portion.

11. The portable terminal of claim 5, wherein a plurality of first dot portions are formed on the bonding surface to be spaced apart from each other in a lengthwise direction of the bonding surface, thereby increasing an area coupled with the plate, and
a plurality of second dot portions are formed on the circumference of the plate to be coupled in an engaged manner with the plurality of first dot portions.

12. The portable terminal of claim 5, wherein the display module is provided on a top surface of the support member, and
wherein the plate is positioned between the support member and the display module.

13. The portable terminal of claim 5, wherein the support member is formed of at least one of STS, Mg, and Al.

14. The portable terminal of claim 5, wherein the support member is formed of at least one of Polycarbonate (PC)+ Glass Fiber (GF), PC, and PC+Acrylonitrile-Butadiene-Styrene (ABS).

15. The portable terminal of claim 13, wherein the plate comprises a metallic thin film plate made of at least one of STS, Mg, and Al.

16. The portable terminal of claim 13, wherein the plate comprises a thin film plate made of a Polycarbonate (PC) material.

17. The portable terminal of claim 14, wherein the plate comprises a metallic thin film plate made of at least one of STS, Mg, and Al.

18. The portable terminal of claim 14, wherein the plate comprises a thin film plate made of a Polycarbonate (PC) material.

19. The portable terminal of claim 5, wherein the bonding surface has a first concave portion formed thereon,
- wherein the plate has a second concave portion formed thereon,
- wherein the plate is adhered to the recessed structure of the bonding surface, and
- wherein the bonding surface and the plate are coupled so as to engage the first concave portion with the second concave portion such that the flat top surface of the plate is level with a surface of the display module support member.

20. The portable terminal of claim 5, wherein the flat bottom surface of the plate is adhered to the bonding surface,
- wherein an interface at which the flat bottom surface of the plate is adhered to the bonding surface is at a top surface of the display module support member.

21. The portable terminal of claim 5, wherein the bonding surface has a first concave portion formed thereon,
- wherein the plate has a second concave portion formed thereon, and
- wherein the bonding surface and the plate are coupled so as to engage the first concave portion with the second concave portion.

* * * * *